Nov. 22, 1949     W. TURKOWSKI     2,488,998
MOTOR DRIVEN FILING MECHANISM
Filed Sept. 4, 1945
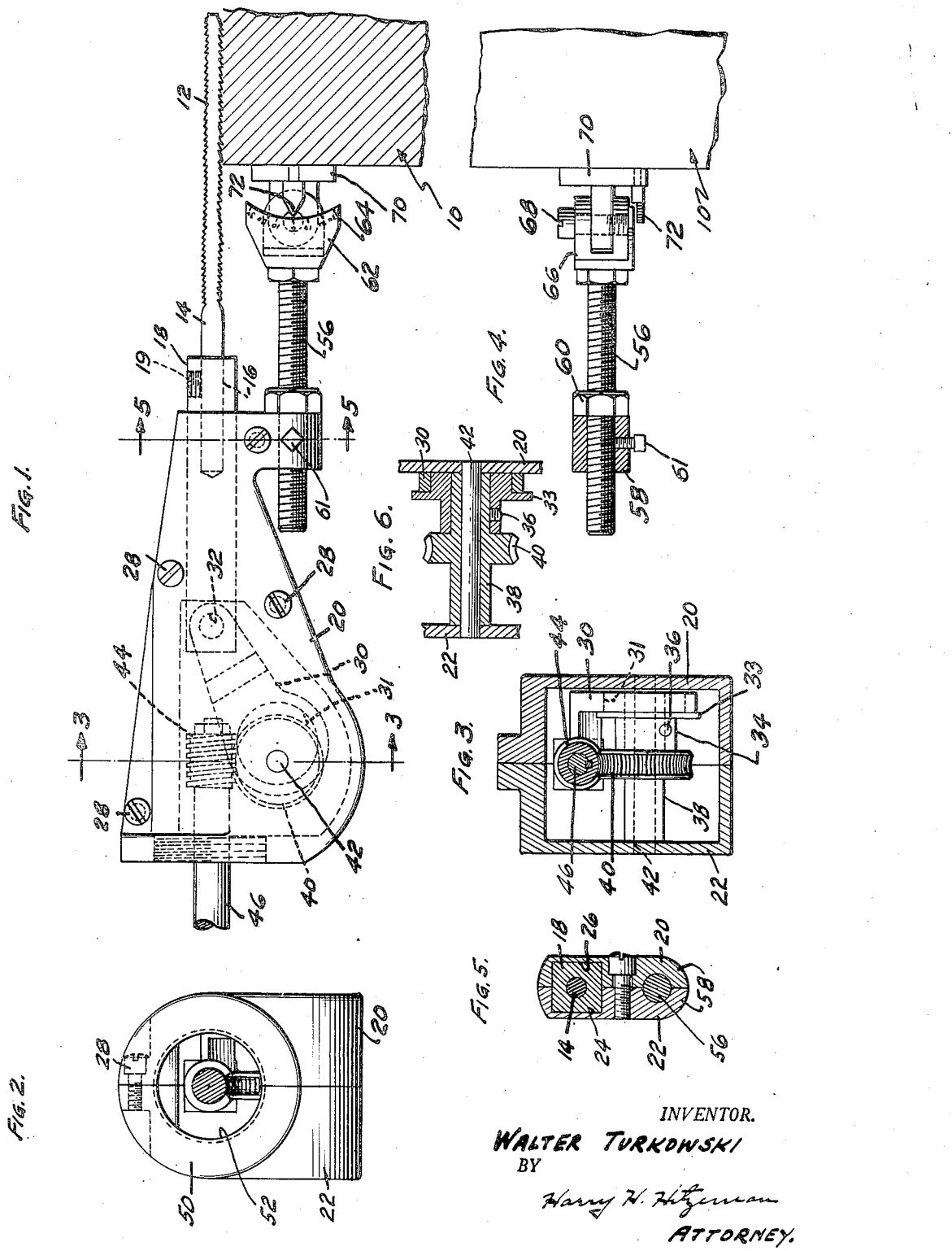
INVENTOR.
WALTER TURKOWSKI
BY
*Harry H. Hitzeman*
ATTORNEY.

Patented Nov. 22, 1949

2,488,998

UNITED STATES PATENT OFFICE 2,488,998

MOTOR-DRIVEN FILING MECHANISM

Walter Turkowski, Hollywood, Ill.

Application September 4, 1945, Serial No. 614,264

1 Claim. (Cl. 29—76)

My invention relates to improvements in motor driven tools of the type which are ordinarily operated by hand for the purpose of making dies, fixtures, jigs and similar devices.

My invention relates more particularly to improvements in a motor driven filing or sawing device or any other tool that operates by being oscillated back and forth over an article that is being worked upon.

The principal object of the present invention is to provide an improved motor driven filing or sawing mechanism capable of being easily and quickly attached to a small fluid or other type of motor so that the tool may be motor driven instead of operated by hand as in the past.

A further object of the present invention is to provide a motor driven mechanism of the type described that is easily and simply constructed of standard parts and a die-cast housing, capable of easy assembly so that the mechanism is easily constructed and easily assembled or disassembled for the purpose of repair or replacement of any worn parts.

A further object of the present invention is to provide a filing or sawing mechanism of the type described having an adjustment associated therewith so that within limits any desired angle of filing, sawing or other working may be accomplished.

A further object of the invention is to provide in a filing or sawing mechanism of the type described a further adjustment by which the depth of the cut or filing operation may be accurately determined in advance, and the mechanism set for the exact stroke desired.

Other objects and advantages will be more apparent from the following description wherein reference is had to the accompanying sheet of drawings, upon which Fig. 1 is a side elevational view of my improved motor driven filing mechanism with the motor shaft which drives the same being broken into section;

Fig. 2 is an end elevational view of the same;

Fig. 3 is a vertical cross-sectional view thereof taken on the line 3—3 of Fig. 1;

Fig. 4 is a plan view of the angle and depth adjustment mechanism, with a portion broken into section to more clearly show other parts;

Fig. 5 is a vertical sectional view taken on the line 5—5 of Fig. 1; and Fig. 6 is a fragmentary sectional view on the shaft of the eccentric drive.

In the embodiment of the invention which I have chosen to illustrate and describe, in Fig. 1 I have shown an object 10 which it is desired to file or saw to shape the same for a desired purpose. I have shown a file 12 which may be provided with a circular end portion 14 adapted to fit into a socket 16 in an oscillating rod 18. The saw member is fastened in the rod by a suitable set screw 19.

The oscillating rod 18 may be positioned in a pair of split housing members 20 and 22 in suitable guide ways 24 and 26 milled in opposite sides of the same. The housing, which is split centrally as shown, may have the separable sections securely fastened together by a plurality of counter-sunk head screws 28. An offset crank 30 may be connected to the end of the rod 18 by a pivot pin 32. The crank may extend to one side as shown, and engage an eccentric 31 having a shoulder 34 that is fastened by a key 36 to the hub 38 of a worm wheel 40. A spacer portion on the eccentric 31, 33 prevents sideways movement of the crank. The hub 38 of the worm wheel is mounted for rotation upon a shaft 42 which is journalled in suitable bearings in the vertical walls of the housing sections 20 and 22.

The worm wheel 40 may be driven by a worm 44 keyed to the end of a suitable motor shaft 46 which extends outwardly through the tapped opening 52 in the end wall 50 of the filing mechanism housing.

The entire mechanism may be connected to either a fluid or other type of high speed fractional horse power motor by means of the tapped opening 52 in the wall 50 of the housing of the filing mechanism, which may screw on a threaded extension on the motor.

As most clearly shown in Figs. 1 and 4, I have provided a depth gauge and angle adjustment mechanism which may include a threaded rod 56 that passes through a bracket portion 58 in the split housing members. I provide a locking nut 60 for the desired depth adjustment and a set screw 61 to key the rod in the housing against rotation during operation.

Means for adjusting the filing, sawing or other operation to a desired angle may comprise a plate 62 having indicia 64 adjacent an arcuate edge of the same. The plate 62 is adapted to be fastened to the end of rod 56 in front of a yoke 66 that is fastened by a set screw 68 to a pad member 70 which rests against the article 10 that is being worked upon. The pad 70 carries a pointer 72 which, as the pad is swung about the pivot 68, will travel in an arc along the indicia 64 and by fastening the set screw, the exact angular position that is desired can be obtained. Thus, for example, in the drawings the pointer is set at zero, indicating that the file is being worked at 90° to the pad 70.

While I have illustrated and described a specific embodiment of my invention, it will be apparent to those skilled in the art that changes and modifications may be made in the exact details shown, and I do not wish to be limited in any particular; rather what I desire to secure and protect by Letters Patent of the United States is:

A depth gauge and angle adjustment for a motor driven file unit having a housing, comprising a threaded rod extending forward from the housing of the motor driven file unit, a locking nut on said rod for fastening against the housing at the desired lateral adjustment, a set screw to key the rod in said housing against rotation, a plate mounted on the end of said rod having an arcuate edge, a scale upon the arcuate edge of said plate, a yoke extending forward from said plate, a pivot on said yoke, a pad mounted on said pivot and a pointer carried by said pad and extending to said scale to indicate the angular position of said pad.

WALTER TURKOWSKI.

REFERENCES CITED

The following references are of record in the file of this patent:

UNITED STATES PATENTS

| Number | Name | Date |
|---|---|---|
| 739,496 | Kidder | Sept. 22, 1903 |
| 1,035,524 | Bradley | Aug. 13, 1912 |
| 1,406,071 | Pavelka | Feb. 7, 1922 |
| 1,636,729 | Yarrington | July 26, 1927 |
| 1,808,228 | Hulack et al. | June 2, 1931 |
| 2,122,611 | Kirby | July 5, 1938 |
| 2,282,648 | Drefahl | May 12, 1942 |